June 26, 1951  S. W. SPARROW  2,558,226
PISTON RING TESTING APPARATUS
Filed Sept. 10, 1947  2 Sheets-Sheet 2
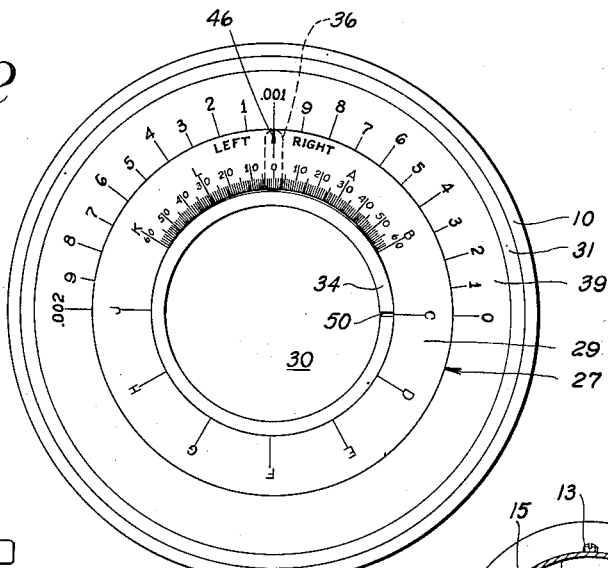
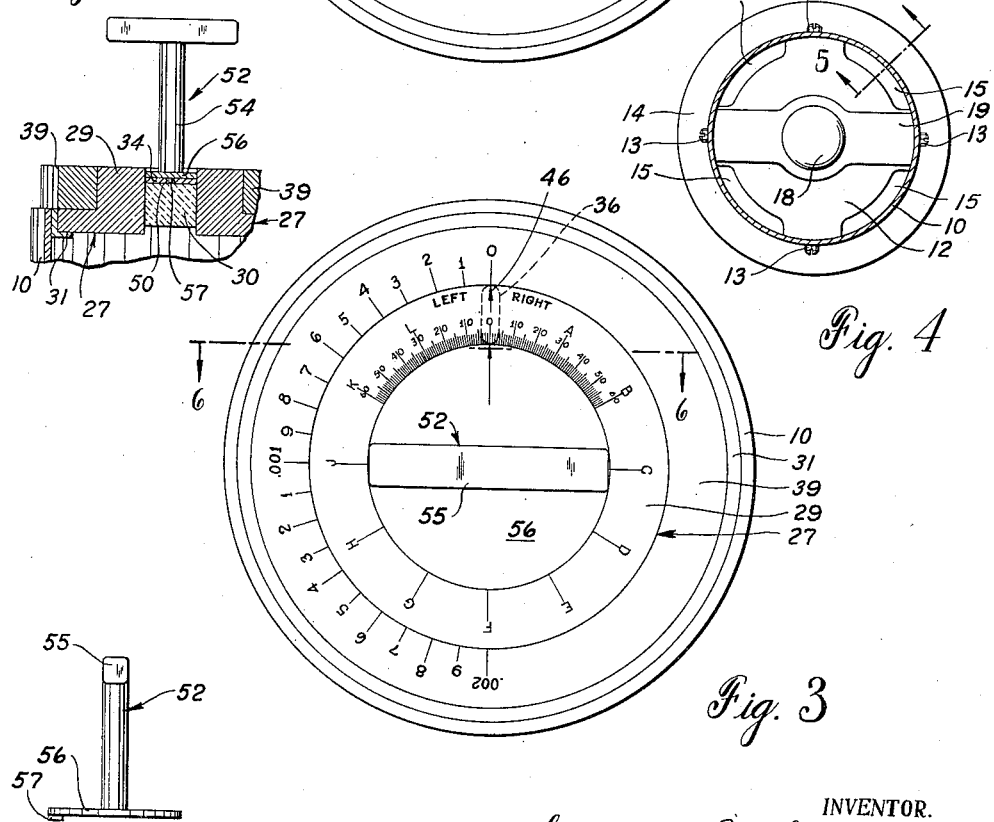
INVENTOR.
BY Stanwood W. Sparrow
Brown, Jackson, Boettcher & Dienner
ATTORNEYS.

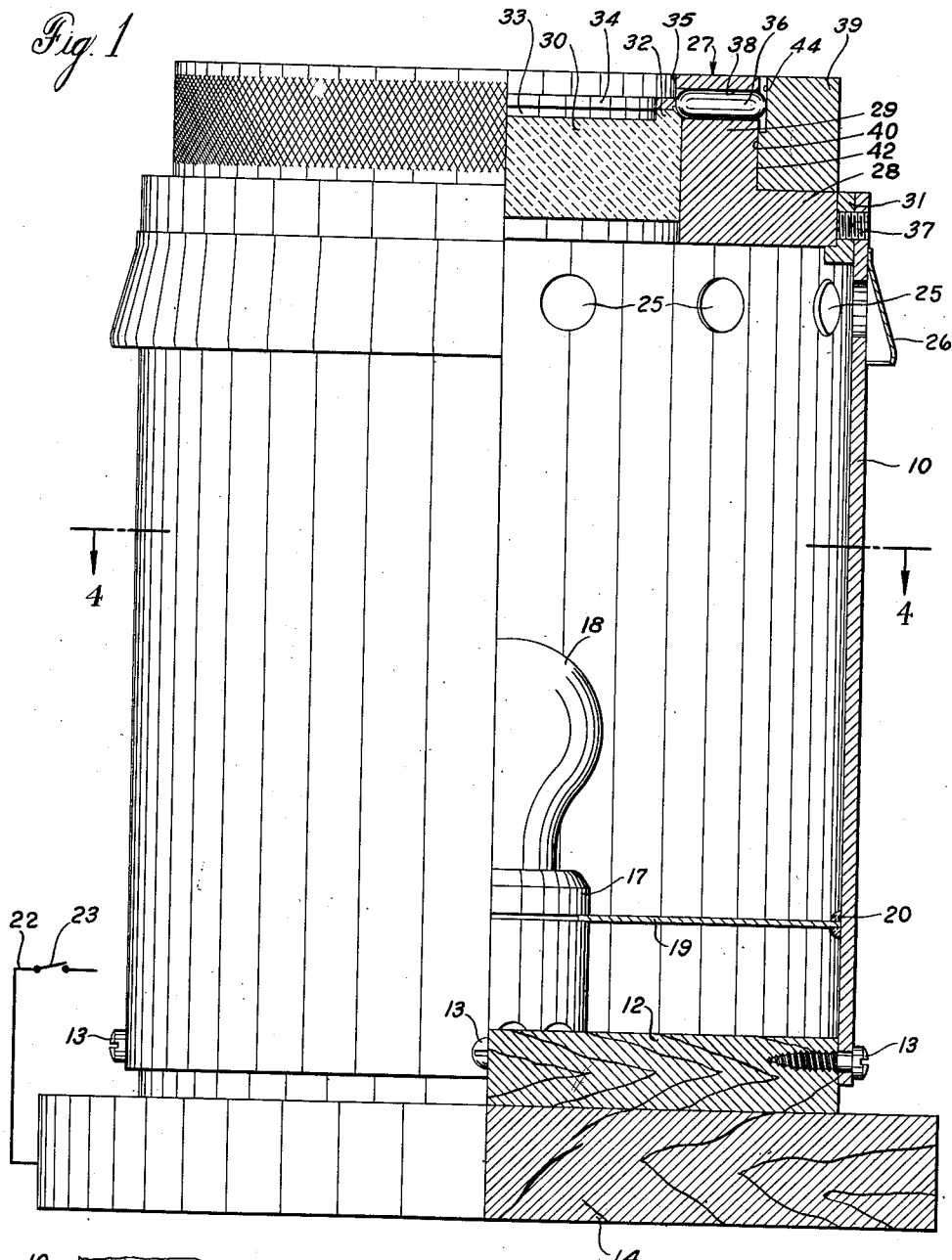

Patented June 26, 1951

2,558,226

UNITED STATES PATENT OFFICE 2,558,226

PISTON RING TESTING APPARATUS

Stanwood W. Sparrow, South Bend, Ind., assignor to The Studebaker Corporation, South Bend, Ind., a corporation of Delaware Application September 10, 1947, Serial No. 773,131

9 Claims. (Cl. 73—120)

My present invention relates to an apparatus for testing resilient articles such as piston rings and the like.

So far as I am aware, there is no known apparatus for determining the comparative resiliency characteristics of different portions of spring-like members, or of a plurality of members with respect to each other, such as piston rings and the like. It is an object of my invention to provide an apparatus in which, for example, a piston ring may be subjected at selected points about its periphery to varying degrees of deflection to determine the effect of such deflection to other portions of the ring.

In the apparatus of my present invention I provide for the support of a piston ring and in which means is embodied to exert various degrees of deflection at selected points on the periphery of the ring, say deflection at the selected points in a range extending from 0 to .002 inch, with the apparatus embodying further means by which the deflection of the ring about the periphery thereof in opposite directions from the point of the imposition of the deflecting force imposed on the ring, may be observed. The apparatus has utility, for example, in determining in a split piston ring of conventional form if the deflection through the ring is uniform by deflecting the ring centrally between the split ends, and observing if the deflection in opposite directions from the point at which the deflecting force is applied is substantially the same or not. If the degree of such deflection in opposite directions is the same, it would appear that, that desirable characteristic for the piston ring is present. The apparatus has further utility in applying deflecting forces of varying degrees at other selected points on the periphery of the ring, with respect to the split in the ring, to determine the deflection characteristics of substantially all portions of the ring, with respect to each other. The apparatus has wide utility for comparing such deflecting characteristics of piston rings of different manufacture and composition, as well as providing an apparatus in which rings having substantially matching characteristics may be selected for use with the pistons of an internal combustion engine to achieve maximum performance of the engine.

It is a preferred feature of my present invention to provide an apparatus comprising means for supporting a piston ring or the like, together with means for deflecting the piston ring substantially at a point on the periphery thereof, and with scale means being provided for measuring the extent of deflection of the piston ring in opposite directions from the point at which the deflecting force is applied.

A further preferred feature of my invention resides in providing a supporting means having an annular portion within which a piston ring is snugly received and about the outer cylindrical surface of which a cam member is rotatably mounted with the cam member being adapted to effect radial inward movement of a plunger mounted in the annular portion of the supporting means into engagement with the periphery of the piston ring. In the preferred form of my invention the cam ring is provided with scale means for indicating the extent to which the plunger is moved radially inwardly into engagement with the piston ring, and the annular portion of the supporting means is preferably provided with scale means by which the extent of deflection of the ring may be measured.

A still further preferred feature of my invention resides in providing an apparatus as last aforesaid in which a light source is disposed below the ring supporting means, with the ring supporting means, including a transparent portion through which light is normally prevented from passing by the disposal of the piston ring upon the transparent portion but which, when the piston ring is deflected inwardly by the plunger above referred to, light seepage occurs at the deflected portion of the ring the extent of which deflection is readily determinable by observing the extent of the light projecting on the scale inscribed on the piston ring supporting means.

A still further preferred feature of my invention resides in providing the ring supporting means with a second scale means at which the split in the piston ring may be selectively disposed for positioning the same relative to the point at which the deflecting force is applied to the piston ring for observing the deflection characteristics of the ring of different points of application of deflecting force with respect to the split in the ring.

A still further preferred feature of my invention is to provide a handle member having a lug or ear element adapted to be disposed between the ends of the piston ring at the split therein for adjusting the position of the ring on the supporting means.

The above and other objects, advantages, and features of my invention will appear from the detailed description.

Now in order to acquaint those skilled in the art with the matter of constructing and utilizing an apparatus in accordance with my invention, I shall describe, in connection with the accompany drawings, a preferred embodiment of my invention.

In the drawings:

Figure 1 is a view, partly in elevation and partly in section, with certain parts being shown in elevation, of an apparatus constructed in accordance with my present invention;

Figure 2 is a plan view of the apparatus of Figure 1;

Figure 3 is a view corresponding to Figure 2 but showing a handle means for selectively adjusting the position of the piston ring shown in Figure 2 to other positions on the ring supporting means of the apparatus;

Figure 4 is a horizontal sectional view on reduced scale taken substantially along the line 4—4 of Figure 1 looking in the direction indicated by the arrows;

Figure 5 is a detail vertical sectional view taken substantially on the line 5—5 of Figure 4 looking in the direction indicated by the arrows;

Figure 6 is a detail vertical sectional view taken substantially on the line 6—6 of Figure 3 looking in the direction indicated by the arrows; and Figure 7 is an end elevational view of the handle means for the apparatus for rotating a split piston ring to different positions on the supporting means of the apparatus.

Referring now to the drawings, the apparatus of my invention comprises a sheet-metal tubular member 10, a spider member 12 made of wood secured in the lower end thereof by a plurality of screws 13, with the spider member 12 in turn being suitably secured upon a base member 14 of wood in any suitable manner. As illustrated in Figures 4 and 5, the spider member 12 is provided with a plurality of peripheral recesses 15 which, together with the adjacent inner surface of member 10, define a plurality of passages, such as shown at 16 in Figure 5, through which cooling air enters into the lower end of the member 10 for a purpose to be described.

The spider member 12 provides for support of a conventional form of lamp socket 17 for an electric light bulb 18, with the light bulb socket 17 being further supported in a transversely extending sheet-metal bracket member 19 suitably secured at its outer ends as by welding to the adjacent inner surface of the tubular member 10, as indicated at 20. The socket 17 is in circuit in a line 22 controlled by a switch 23 with the circuit being of a conventional form in which upon closing of the switch 23 the lamp 18 is energized to provide a light source for the apparatus, the purpose of which will be discussed in greater detail hereinafter. At its upper end the tubular member 10 is provided with a plurality of openings 25 through which heated air collecting within the tubular member is discharged. The tubular member is further provided about its outer periphery adjacent the openings 25 with a flared skirt 26. The skirt 26 is secured as by welding along its upper edge to the tubular member 10, so that heated air discharged through the several openings 25 is directed downwardly exteriorly of the tubular member 10. The plurality of passages 16 formed between the base member 12 and the periphery of the lower end portion of the tubular member 10 provide for the admittance of cooling air into the tubular member 10 to convey heat developed by the bulb 18 through the discharge openings 25 and then outwardly of the tubular member 10 to provide for cooling of the socket means and the electric bulb means of the apparatus.

A piston ring supporting means, indicated generally at 27, comprises a metal ring-like member 28 having an annular portion 29 within which a transparent member 30 made of glass or the like is suitably secured. The transparent member 30 is provided with a raised annular peripheral shoulder portion 32 through which light from light bulb 18 is adapted to be transmitted. The surface of the recess 33 within the annular shoulder 32 preferably is provided with an opaque coating, so that light from the bulb 18 is only adapted to be transmitted through the outer raised annular shoulder portion 32 of the member 30. If desired, it will be understood that the bottom surface of the transparent member 30, opposite the surface of recess 33, could be provided with an opaque coating instead of, or together with, the opaque coating of the upper surface at recess 33, so that light is adapted to be transmitted through the member 30 only through the outer annular peripheral shoulder 32. The annular shoulder portion 32, as shown, is adapted to support a split piston ring 34 with the outer periphery of the piston ring 34 being adapted to have snug engagement with the inner cylindrical surface 35 of the annular portion 29 of supporting member 28.

The ring supporting means 27 is mounted in the upper end of tubular member 10 by means of an annular flanged member 31 and a plurality of screws, one of which is shown at 37 having threaded engagement with the tubular member 10 and flanged member 31 with the inner ends of the screws bearing against the member 28.

A plunger 36 of substantially cylindrical form and having its inner and outer ends of substantially semi-spherical formation is disposed in a radial bore 38 in the annular portion 29 of the member 28, and is adapted to be moved radially inwardly by a cam ring member 39 formed with an inner cylindrical surface portion 40 adapted to have rotatable movement upon the cylindrical surface 42 of the annular portion 29 of member 28. The ring member 39 is formed with a cam surface 44 which is adapted to have, upon rotation of the cam ring means 39, camming engagement with the outer end of plunger 36 to move the same radially inwardly to deflect the piston ring 34 inwardly a predetermined amount. The cam ring means 39, as illustrated in Figures 2 and 3, is provided with a scale reading from 0 to .002 inch with the position of the scale relative to an arrow 46 on the upper surface of the annular portion 29 of the supporting means 27 to indicate the extent to which the plunger member 36 is moved radially inwardly, and in that manner give a measure of the extent of deflection applied to the ring at the point of the periphery thereof engaged by the inner end of plunger 36. The upper surface of the annular portion 29 at the inner periphery thereof is provided with a scale reading from 0 in alignment with the arrow 46 thereof to a value of 60 in opposite directions. The graduations on the scale from 0 to 60 in the opposite directions is an arbitrary scale, and is provided for purposes of determining the extent of deflection of piston ring by the imposition thereon of a predetermined degree of deflection imposed at a selected point on the ring by the plunger 36. The annular portion 29 is also provided with a further scale comprising equal divisions A through L at which positions the split 50 of the piston rings 34 may be selectively disposed, and with respect to which the degree of deflection effected by predetermined inward positions of the plunger 36 by rotatable cam means 39 provides for the determination of the relative deflection characteristics of the ring with respect of the split therein, so that the comparative deflection characteristics of different portions of a given piston ring or of a plurality of different piston rings may be measured.

The apparatus further comprises a handle means generally indicated at 52 which, as shown in Figures 3, 6 and 7, comprises a stem 54 and an integral transversely extending member 55, with the opposite end of the stem carrying a plate member 56 having an integral ear 57. The ear 57 is adapted to be disposed in the split of a piston ring, so that the piston ring may be turned by turning of handle 52 within the internal recess of the ring supporting means 27 to dispose the split of the ring at any of the several points A through L.

In determining the comparative resiliency characteristics of a piston ring, the cam ring member 39 is set at 0 position and a piston ring, such as that shown at 34, is disposed upon the transparent member 30 of the piston ring supporting means 27. With the split of the piston ring in a predetermined position with respect of scale A to L, the cam ring 39 is rotated in a clockwise direction, as viewed in Figures 2 and 3, to effect radial inward movement of the plunger 36 over a range in the particular form of the apparatus shown from 0 to .002 inch. Upon the application of a predetermined deflecting force within the range noted of the embodiment described to a predetermined selected point on the periphery of the piston ring, the piston ring will be deflected a certain amount in one or both directions from the point of engagement of plunger 36 with the piston ring with the degree of such deflection being adapted to be determined from the scale 0 to 60. This deflecting of the piston ring radially inwardly will permit the seepage of light from the light source 18 through the uncovered peripheral portion of the transparent shoulder 32. This seepage of the light may be readily observed on the scale on the upper surface of the member 29 reading in opposite direction from 0 to 60, so that the relative amount of deflection of the ring caused by the imposition of a known degree of flexing of the ring at a predetermined point thereon may be determined. Thus, by positioning of the split between the ends of the ring in any of the several positions A through L, the relative deflection characteristics of the ring deflected at selected points on the periphery thereof in an amount from 0 to .002 inch in the apparatus of the embodiment of my invention shown, may be obtained.

While I have shown what I consider to be a preferred embodiment of my invention, it will be understood that various modifications and rearrangements may be made therein without departing from the spirit and scope of my invention, I claim:

1. In an apparatus of the class described, the combination of an annular supporting means having a recess for snugly receiving a piston ring or the like, cam means having a portion rotatably mounted about the periphery of said supporting means, plunger means carried by said supporting means for movement radially inwardly of said recess and engageable by said cam means for forcing the same into engagement with said piston rings to deflect the latter, and said supporting means including means by which the extent of deflection of the piston rings may be measured.

2. In an apparatus of the class described, the combination of annular supporting means having a recess for snugly receiving a piston ring or the like, cam means having a portion rotatably mounted about the periphery of said supporting means, plunger means mounted in said supporting means for movement radially inwardly of said recess and adapted to be engaged by said cam means for forcing the same into engagement with said piston ring substantially at a point on the periphery thereof to deflect the latter, and means at said supporting means by which the extent of deflection of said piston ring in opposite directions from said point may be measured.

3. In an apparatus of the class described, the combination of supporting means including an annular portion and a transparent member for supporting a piston ring or the like in a substantially horizontal plane, a source of light disposed below said transparent member with said piston ring being adapted to normally block off transmittal of light about the periphery of said transparent member, cam means having a portion for rotatably mounting the same about the periphery of said annular portion of said supporting means, a plunger mounted for radial movement in said annular portion of said supporting means, said cam means having a cam portion adapted upon rotation thereof to engage the outer end of said plunger means to move the same radially inwardly into engagement with the periphery of the piston ring, and scale means for said annular portion of said supporting means disposed about the periphery of said transparent member whereby upon deflection of said piston ring the extent of deflection is observable by seepage of light through said transparent member about the periphery of the deflected portion of the piston ring.

4. In an apparatus of the class described, the combination of supporting means for a split annular member such as a piston ring or the like having an annular portion forming a recess to snugly receive the annular member, cam means having a portion rotatably mounted about the outer periphery of said annular portion of said supporting means, a plunger mounted for radial movement in said annular portion of said supporting means, said cam means having a cam surface adapted upon rotation thereof to engage the outer end of said plunger means to move the same radially inwardly into engagement with the periphery of said annular member, and said annular portion of said supporting means having scale means for measuring the extent of deflection of said annular member by said plunger means.

5. In an apparatus of the class described, the combination of supporting means for a split annular member such as a piston ring or the like having an annular portion forming a recess to snugly receive the annular member, cam means having a portion rotatably mounted about the outer periphery of said annular portion of said supporting means, a plunger mounted for radial movement in said annular portion of said supporting means, said cam means having a cam surface adapted upon rotation thereof to engage the outer end of said plunger means to move the same radially inwardly into engagement with the periphery of said annular member, said annular portion having scale means thereon whereby the split of said annular member may be disposed in predetermined selected positions relative to said plunger means.

6. In an apparatus of the class described, the combination of supporting means for a split member such as a piston ring or the like having an annular portion forming a recess to snugly receive the annular member, cam means having a portion rotatably mounted about the outer periphery of said annular portion of said supporting means, a plunger mounted for radial movement in said annular portion of said supporting means, said cam means having a cam surface adapted upon rotation thereof to engage the outer end of said plunger means to move the same radially inwardly into engagement with the periphery of said annular member, said annular portion of said supporting means having scale means by which the extent of deflection of said annular member by said plunger means may be measured and said cam means having scale means thereon for indicating the extent to which said plunger means is moved radially inwardly thereby.

7. In an apparatus of the class described, the combination of supporting means for a split annular member such as piston ring or the like having an annular portion forming a recess to snugly receive the annular member, cam means having a portion rotatably mounted about the outer periphery of said annular portion of said supporting means, a plunger mounted for radial movement in said annular portion of said supporting means, said cam means having a cam surface adapted upon rotation thereof to engage the outer end of said plunger means to move the same radially inwardly into engagement with the periphery of said annular member, said annular portion of said supporting means having scale means about its inner periphery adjacent said plunger means, said supporting means including a transparent portion adjacent said scale means which in the normal position of said annular member is covered thereby, and a source of light below said transparent portion whereby upon deflecting of the annular member the extent of deflection thereof is observable by the extent of seepage of light about the periphery of said annular member at said scale means.

8. In an apparatus of the class described, the combination of supporting means for a split annular member such as a piston ring or the like having an annular portion forming a recess to snugly receive the annular member, cam means having a portion rotatably mounted about the outer periphery of said annular portion of said supporting means, a plunger mounted for radial movement in said annular portion of said supporting means, said cam means having a cam surface adapted upon rotation thereof to engage the outer end of said plunger means to move the same radially inwardly into engagement with the periphery of said annular member, said annular portion of said supporting means having scale means whereby the extent of deflection of said annular member by said plunger means may be measured, said annular portion having scale means thereon whereby the split of said annular member may be disposed in predetermined positions relative to said plunger means.

9. In an apparatus of the class described, the combination of supporting means for a split annular member such as a piston ring or the like having an annular portion forming a recess to snugly receive the annular member, cam means having a portion rotatably mounted about the outer periphery of said annular portion of said supporting means, a plunger mounted for radial movement in said annular portion of said supporting means, said cam means having a cam surface adapted upon rotation thereof to engage the outer end of said plunger means to move the same radially inwardly into engagement with the periphery of said annular member, said annular portion of said supporting means having scale means whereby the extent of deflection of said annular member by said plunger means may be measured, said annular portion having scale means thereon whereby the split of said annular member may be disposed in predetermined positions relative to said plunger means, and said cam means having scale means thereon whereby the extent to which said plunger means is moved radially inwardly thereby.

STANWOOD W. SPARROW.

REFERENCES CITED

The following references are of record in the file of this patent:

UNITED STATES PATENTS

| Number | Name | Date |
|---|---|---|
| 1,332,570 | Ray | Mar. 2, 1920 |
| 1,332,571 | Ray | Mar. 2, 1920 |
| 1,840,118 | Marlin | Jan. 5, 1932 |
| 1,933,354 | Teetor | Oct. 31, 1933 |
| 2,353,626 | Schnaars | July 11, 1944 |
| 2,419,263 | Hohwart | Apr. 22, 1947 |
| 2,441,343 | Becker | May 11, 1948 |